United States Patent [19]

Noda et al.

[11] Patent Number: 5,018,836
[45] Date of Patent: May 28, 1991

[54] OPTICAL DISC APPARATUS LENS DRIVE APPARATUS AND METHOD FOR THE MANUFACTURE OF SUCH

[75] Inventors: Yasushi Noda, Tokyo; Kenji Shimozawa, Musashino; Takashi Kamisaka, Kodaira, all of Japan

[73] Assignee: Teac Corporation, Tokyo, Japan

[21] Appl. No.: 472,745

[22] Filed: Jan. 31, 1990

[30] Foreign Application Priority Data

Feb. 2, 1989 [JP] Japan .................................. 1-24406

[51] Int. Cl.$^5$ .............................................. G02B 7/02
[52] U.S. Cl. .................................. 350/247; 350/255; 350/320; 369/44.16
[58] Field of Search ............... 350/247, 255, 252, 320; 369/256, 44.15, 44.16

[56] References Cited

U.S. PATENT DOCUMENTS

| | | | |
|---|---|---|---|
| 4,596,444 | 6/1986 | Ushida | 350/247 |
| 4,653,856 | 3/1987 | Kamiko | 350/255 |
| 4,669,823 | 6/1987 | Iguma et al. | 350/255 |
| 4,750,164 | 6/1988 | Nose | 369/256 |
| 4,911,534 | 3/1990 | Beyersbergen van Henegouwen et al. | 350/255 |

Primary Examiner—Bruce Y. Arnold
Assistant Examiner—Loha Ben
Attorney, Agent, or Firm—Michael N. Meller

[57] ABSTRACT

An objective lens drive apparatus includes an objective lens holder supporting an objective lens and provided with drive coils, a base fixing permanent magnets, printed circuit boards fixing the base at a monolithic portion thereof, and a plural number of flexible support members electrically and mechanically connected at their base ends to the printed circuit board, and with their distal ends supporting the objective lens holder so as to be flexibly displaced to a position where the drive coils oppose the permanent magnets, and wherein terminals of the drive coils are electrically connected to the flexible support members which are different with each other, and a drive current is supplied to the drive coils from the printed circuit board to pass through the flexible support members.

10 Claims, 8 Drawing Sheets

5,018,836

OPTICAL DISC APPARATUS LENS DRIVE APPARATUS AND METHOD FOR THE MANUFACTURE OF SUCH

BACKGROUND OF THE INVENTION

The present invention relates to an optical disc apparatus lens drive apparatus and method for the manufacture of such.

An objective lens drive apparatus is provided with a drive coil for focussing and for tracking, both of which have an external drive current applied to them. In order for it to be mass produced, objective lens drive apparatus, including the supply path for the drive current, should desirably have ease of assembly.

In a conventional objective lens drive apparatus, the terminals of the focussing drive coil and the tracking drive coil are connected by free wiring that will be described later.

When a conventional objective lens drive apparatus is assembled, it is necessary during wiring to avoid contact between the individual wires and this not only reduces the workability when assembly is performed, but also is not suited to mass production.

In addition, a plurality of plate spring portions to support the objective lens holder must be mounted one at a time, so it is easy for differences to occur in the precision of mounting, making it difficult to achieve uniform quality for the assembled objective lens drive apparatus.

SUMMARY OF THE INVENTION

The present invention has as a general object the provision of an optical disc apparatus lens drive apparatus and method for the manufacture of such, which is both novel and effective in eliminating these problems.

Another object of the present invention is to provide an objective lens drive apparatus having a configuration in which a flexible support member supporting the objective lens holder is electroconductive, and in which the terminals of the drive coil are connected to this flexible support member.

According to the present invention, the flexible support member functions as a path for the current to the drive coil, so that it is not necessary to have the free wiring that requires much skill, and therefore it is not necessary to pay particular attention to the performance of this work. Moreover, the assembly work can be considerably simplified and it is also possible to achieve a stable and uniform performance for the objective lens drive apparatus that is assembled.

A still further object of the present invention is to provide an objective lens drive apparatus having a configuration in which a flexible printed circuit board adhered to a reinforcing metal plate is fixed to a base portion of the flexible support member mentioned above.

According to the present invention, there is no deformation of the flexible printed circuit boards due to temperature and humidity changes in the environment, and it is possible for the position of each of the flexible support members relative to each other to be maintained and for unnecessary inclination of the optical axis of the objective lens to be prevented.

Yet a further object of the present invention is to provide a method for the manufacture of an objective lens drive apparatus, in which a frame to which a plural number of flexible support members are fastened, is fixed to an objective lens holder and then the portion fastening the flexible support members is cut so that each of the flexible support members is made independent.

According to the present invention, it is possible to improve the mounting position accuracy of each of the flexible support members when compared to the method whereby the flexible support members are mounted one by one, and for the assembly work to be simplified as there is no longer the necessity to determine the positions of each of the flexible support members individually.

DESCRIPTION OF THE PREFERRED EMBODIMENTS

Figure 1:
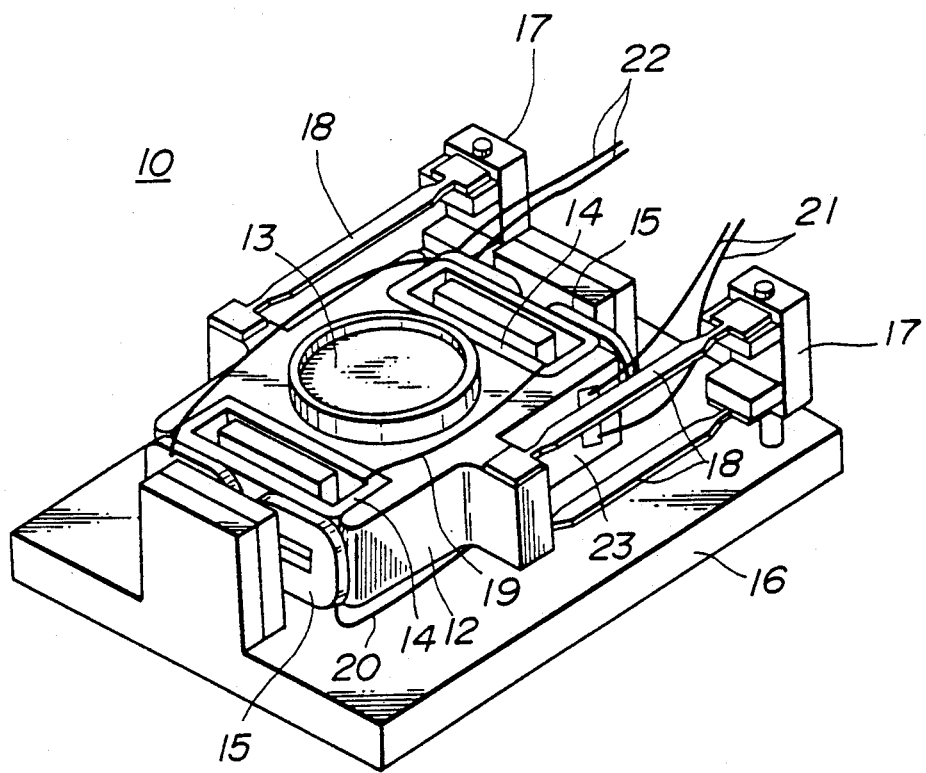
FIG. 1 is a perspective view indicating a conventional objective lens drive apparatus.

FIG. 1 indicates a conventional objective lens drive apparatus 10.

An objective lens holder 12 has mounted on it an objective lens 13, a focussing drive coil 14 and a tracking drive coil 15.

This objective lens holder 12 is movably supported with respect to a fixed portion 17 on a base 16, via a thin flat spring member 18.

In the objective lens holder 12, a wire 19 connects the focussing drive coils 14 on both sides and a wire 20 connects the tracking drive coils 15 on both sides.

The focussing drive coil 14 is connected to an external portion of the objective lens holder 12 by free wiring a wire 21 via a relay terminal member 23, and in the same manner, the tracking drive coil 15 is connected by free wiring a wire 22 via a relay terminal member (not indicated in the figure).

Figure 2:
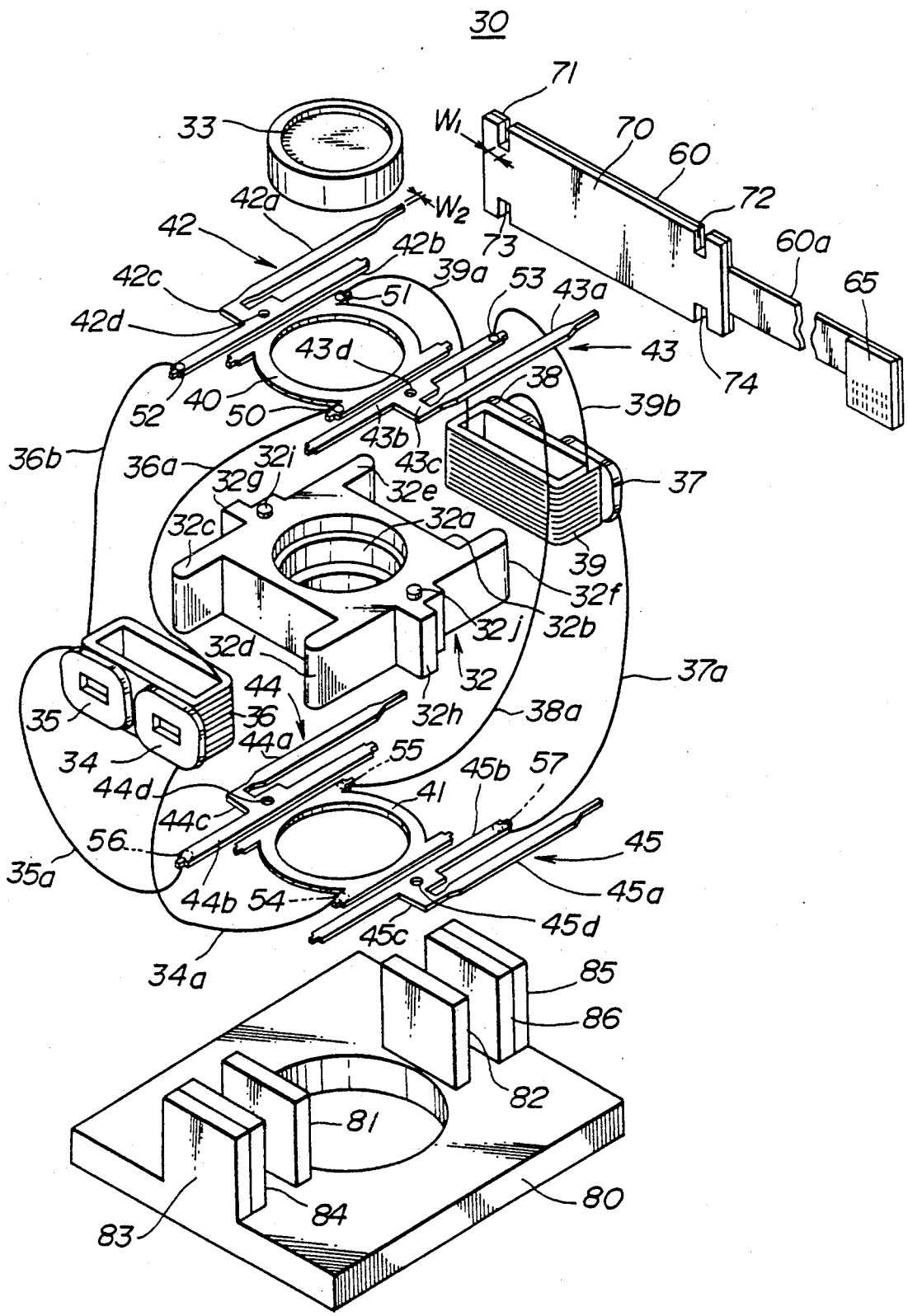
FIG. 2 is an exploded perspective view indicating one embodiment of an objective lens drive apparatus according to the present invention.
Figure 3:
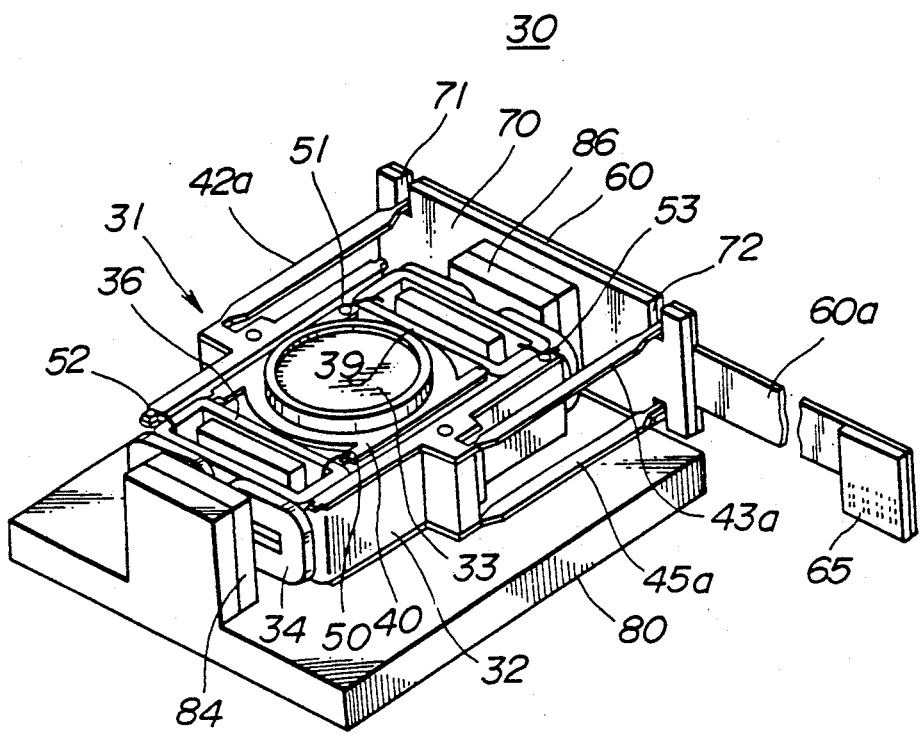
FIG. 3 is a perspective view indicating one embodiment of an objective lens drive apparatus according to the present invention.

FIG. 3 indicates an objective lens drive apparatus according to an embodiment of the present invention, and FIG. 2 indicates the disassembly of the same.

Figure 4:
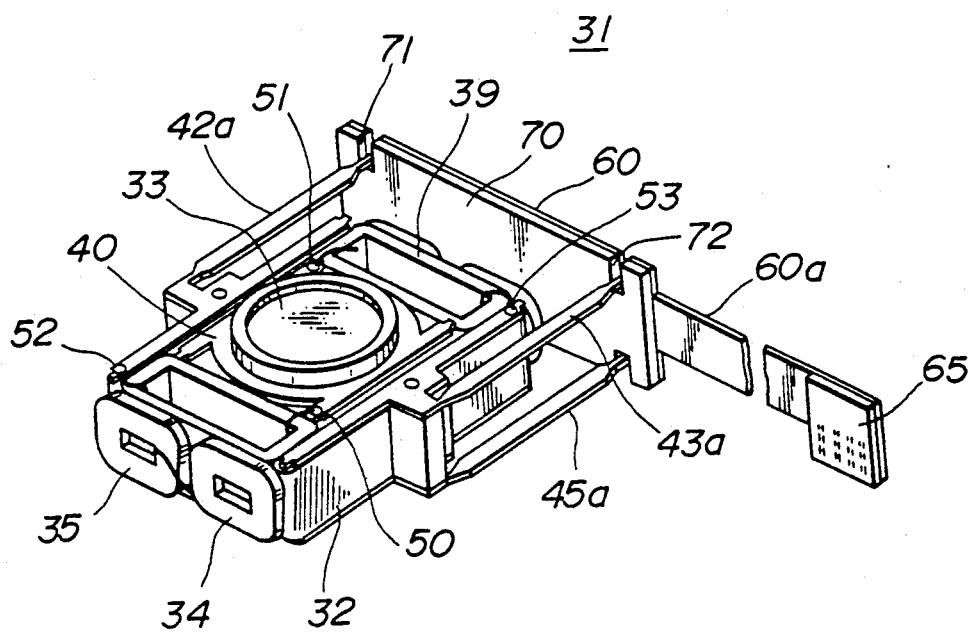
FIG. 4 is a perspective view indicating the state where the apparatus unit of FIG. 3 has been taken out.
Figure 5:
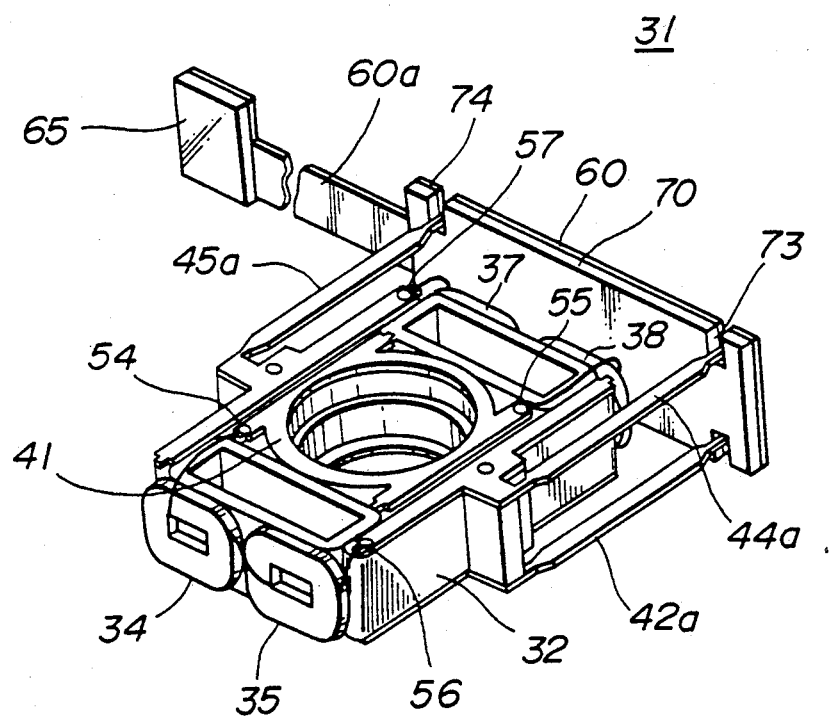
FIG. 5 is a view indicating the apparatus unit of FIG. 4, where the top and bottom have been reversed.

FIG. 4 indicates the device unit 31 of an objective lens drive apparatus 30 of FIG. 3 and FIG. 5 is a view indicating the apparatus unit of FIG. 4, where the top and bottom have been reversed.

Figure 6:
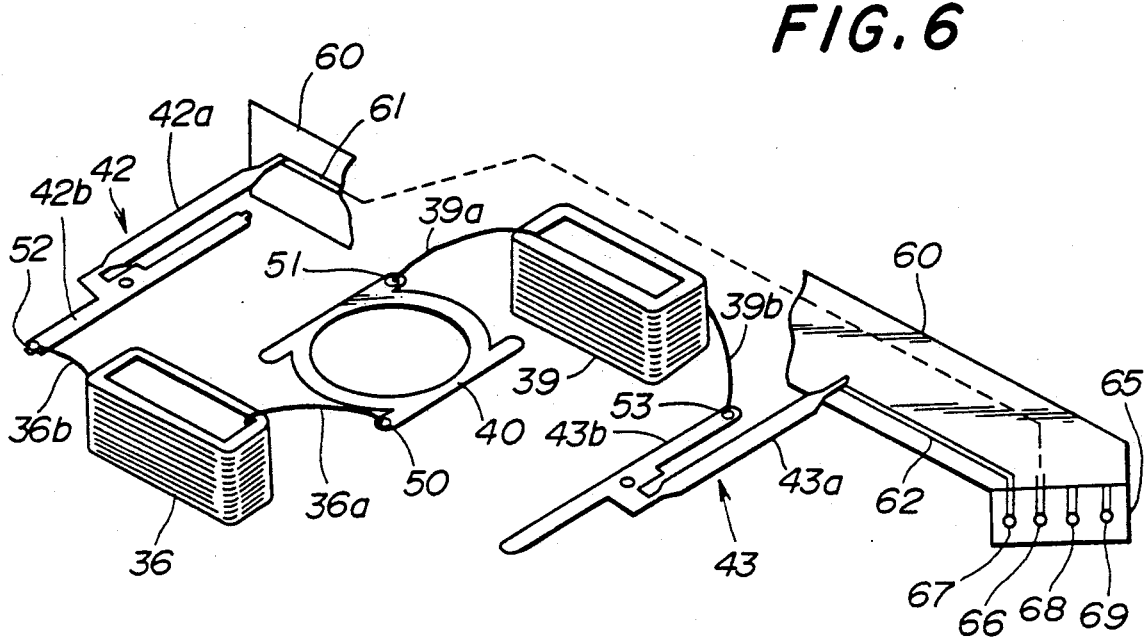
FIG. 6 is a view indicating the path for the supply of the focussing control current.
Figure 7:
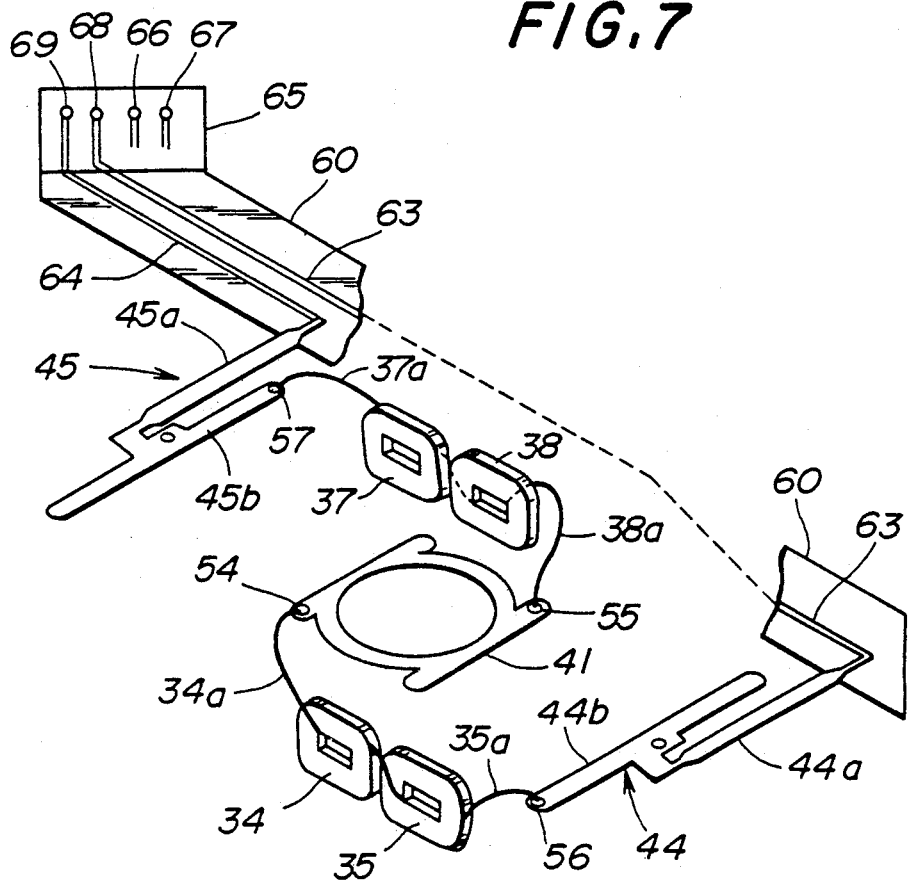
FIG. 7 is a view indicating the path for the supply of the tracking control current for the condition indicated in FIG. 5.

FIG. 6 is a view indicating the path for the supply of the focussing control current for the condition indicated in FIG. 4. FIG. 7 is a view indicating the path for the supply of the tracking control current for the condition indicated in FIG. 5.

In FIG. 2 through FIG. 5 an objective lens holder 32 is made of an insulating material such as a ceramic or a synthetic resin or the like. This objective lens holder 32 has a shape approximately that of a letter "H", has arm portions protruding on both sides symmetrically from a center, and has a central portion 32b having an opening 32a and arm portions 32c through 32h.

To this objective lens holder 32 are fixed the objective lens 33 which engages with the opening 32a, the tracking drive coils 34 and 35 which are fixed to the focussing drive coil 36 which engages and is arranged between the arm portions 32c and 32d, and the tracking drive coils 37 and 38 which are fixed to the focussing drive coil 39 which engages and is arranged between the arm portions 32e and 32f.

In addition, the first ring 40 and the second ring 41 and the flat springs 42 through 45 are made of berrylium copper or phoshor bronze and have electroconductivity.

Each of the flat springs 42 through 45 has the shape of a letter "T" at one end to form thin first, second, and third flat spring members 42a, 42b, and 42c as the first, second, and third flexible support members. The "T" shaped portions respectively have the long stem portions 42b through 45b which are longer than the short arm portions 42c through 45c and which have small holes 42d through 45d in the vicinity of where the arms of the "T" shape branch out from the stems.

The rings 40 and 41 surround the opening 32a and are fixed to the objective lens holder 32 on the upper surface and the lower surface respectively of the central portion 32b of the objective lens holder 32.

The flat spring 42 has its position determined by the engagement of a protrusion 32i with the small hole 42d and is secured on the upper surface of the objective lens holder 32 with the arm portion 42b being fixed to the top of the arm portions 32c and 32e, while the flat spring 42a extends parallel to the objective lens holder 32.

The flat spring 43 has its position determined by the engagement of a protrusion 32j with the small hole 43d and is secured on the upper surface of the objective lens holder 32 with the arm portion 43b being fixed to the top of the arm portions 32d and 32f, while the flat spring 43a extends parallel to the objective lens holder 32.

The flat springs 44 and 45 are fixed in the same manner to the lower surface of the objective lens holder 32, as the flat springs 42 and 43 are fixed to the upper surface of the objective lens holder 32.

The following is a description of the wiring, commencing from the focus drive coil 36 and the focus drive coil 39.

As will be described below, the first ring 40 and the flat springs 42 and 43 fixed to the upper surface of the objective lens holder 32 are used to electrically connect the focus drive coil 36 to the focus drive coil 39, and to electrically connect the focus drive coil 36 to the focus drive coil 39 externally.

As is indicated in FIGS. 2 to 4 and 6, one of the terminals 36a of one focus drive coil 36 is soldered at a position 50 on the ring 40, and one of the terminals 39a of another focus drive coil 39 is soldered in the same manner to another position 51 on the same ring 40. These positions 50 and 51 are both located in the vicinity of the coils 36 and 39 of the ring 40.

The other terminal 36b of the focus drive coil 36 is soldered to a position 52 in the vicinity of the coil 36 of the flat spring 42. This is to say the position 52 is on the arm portion 42b of the flat spring 42 and is located at a position corresponding to the distal end of the arm portion 32c of the objective lens holder 32.

The other terminal 39b of the focus drive coil 39 is soldered to a position 53 in the vicinity of the coil 39 of the flat spring 43. This is to say the position 53 is on the arm portion 43b of the flat spring 43 and is located at a position corresponding to the distal end of the arm portion 32f of the objective lens holder 32.

As shown in FIG. 6, the end of the flat spring 42a of the flat spring member 42 is soldered and connected to a wiring pattern 61 on the flexible printed circuit board 60, and the end of flat spring portion 43a of the flat spring member 43 is soldered and connected to a different wiring pattern 62.

The following is a description of the tracking drive coils 34, 35, 37 and 38.

As is described below, the ring 41 and the flat springs 44 and 45 fixed to the lower surface of the objective lens holder 32 are used for an electrical connection between the tracking drive coils and an external electrical connection with the tracking drive coils.

As shown in FIGS. 2, 3, 5 and 7, the terminal 34a of the coil 34 is soldered to a position 54 in the vicinity of the coil 34 of the ring 41. In addition, the terminal 38a of the coil 38 is soldered to a position 55 in the vicinity of the coil 38 of the ring 41.

Moreover, the terminal 35a of the coil 35 is soldered to a position 56 in the vicinity of the coil 35 of the flat spring 44, at a position whereby the arm portion 44b of the flat spring member 44 corresponds to the distal end of the arm portion 32c of the objective lens holder 32.

The terminal 37a of the coil 37 is soldered to a position 57 in the vicinity of the coil 37 of the flat spring 45, at a position whereby the arm portion 45b of the flat spring member 45 corresponds to the distal end of the arm portion 32f of the objective lens holder 32.

As shown in FIG. 7, the end of the flat spring 44a of the flat spring member 44 is soldered and connected to a wiring pattern 63 of a flexible printed circuit board 60. The end of the flat spring 45a of the flat spring member 45 is soldered to a different wiring pattern 64.

A connector 65 is provided at a distal end of a long protruding portion 60a of the flexible printed circuit board 60.

The connector 65 has focus control current input terminals 66 and 67, and tracking control current input terminals 68 and 69.

As shown in FIG. 2, a metal reinforcing plate 70 is adhered to the flexible printed circuit board 60.

The metal reinforcing plate 70 is formed with cutout portions 71, 72, 73 and 74 at positions corresponding to the flat springs 42a through 45a.

The metal reinforcing plate 70 is fixed to a yoke portion 85 on a base 80 to be described hereinafter.

Figure 8:
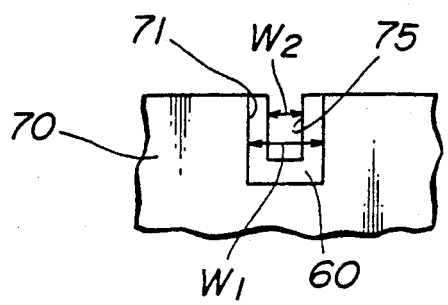
FIG. 8 is an enlarged view indicating a cutaway portion of the metal plate of FIG. 2.

FIG. 8 is an enlarged view of the cutout portion 71. The width $W_1$ of the cutout portion 71 is larger than the width $W_2$ of the flat spring 42a (see FIG. 2). The flexible printed circuit board 60 is also formed with a cutout 75 having the same width $W_2$ as the flat spring 42a in the portion corresponding to the cutout 71. Surrounding the cutout 75 is a pad 76 at an end of a wiring pattern 61. (See FIGS. 9 and 10.)

The other cutouts 72, 73 and 74 are configured in the same manner as has been described above.

Figure 9:
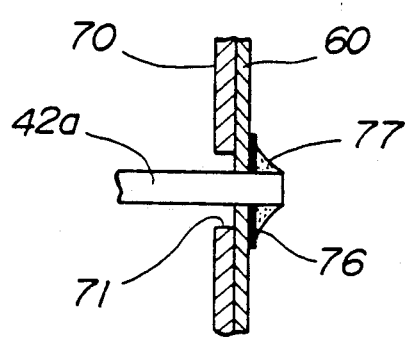
FIG. 9 is a view indicating a flat spring portion soldered to a flexible printed circuit board.
Figure 10:
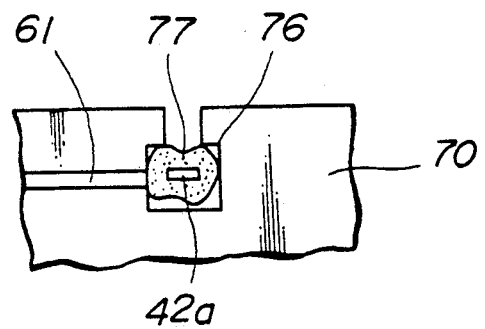
FIG. 10 is a view of the soldered flat spring portion from the side of the flexible printed circuit board.

An end of the flat spring 42a is, as is indicated in FIGS. 9 and 10, soldered by solder 77 to a pad 76, on the side opposite the metal reinforcing plate 70 of the flexible printed circuit board 60, and so that it is in engagement with the cutouts 71 and 75. The flat spring 42a and the inner surface of the cutout 71 are not in contact.

The ends of the other flat springs 43a, 44a and 45a are also in engagement with the cutouts 72, 73 and 74 in the same manner as has been described above, and are soldered to the flexible printed circuit board 60.

In a device unit 31 having the configuration as has been described above, the objective lens holder 32 is in the state where it is supported so that it can be displaced with respect to the metal reinforcing plate 70 by the four flat springs 42a through 45a.

In addition, the above device unit 31 is fixed, as indicated in FIGS. 2 and 3, to the yoke portion 85 by the metal reinforcing plate 70, and the coils 36 and 39 engage the yokes 81 and 82 on the base 80, and the coils 34 and 35 are incorporated into the base 80 in the state where they oppose the permanent magnet 84 on the yoke portion 83, and the coils 37 and 38 are incorporated into the base 80 in the state where they oppose the permanent magnet 86 on the yoke portion 85.

The focus control current is supplied by the terminals 66 and 67, and after it has passed the wiring pattern 61, flows through the flat spring 42a and into the device unit 31 from outside, into the coil 36, through the ring 40 into the coil 39, then through the flat spring 43a and then flows to outside the device unit and through the wiring pattern 62 to reach the terminal 67.

By this focus control current, an electromagnetic force is generated in each of the coils 36 and 39 and the objective lens holder 32 is displaced upwards and downwards to perform focus control.

In addition, the tracking control current is supplied to the terminals 68 and 69, and passes through the wiring pattern 63 and then passes through the flat spring 44a to enter the device unit 31 from outside. It then flows from coil 35 to coil 34, passes through the ring 41, then flows from coil 38 to coil 37 and through the flat spring 45a to then flow outside of the device unit, and then through the wiring pattern 64 to reach the terminal 69.

By this tracking control current, an electromagnetic force is generated in each of the coils 34, 35, 37 and 38 so that the objective lens holder 32 is displaced to the left and right to perform tracking control.

In such an objective lens drive apparatus 30, each of the flat springs 42a through 45a has the function of providing wiring from the device unit 31 to the outside, so it is not necessary to provide the troublesome free wiring for such. The assembly work is considerably simplified when compared to a conventional unit and the quality also becomes more stable.

In addition, the connections between the coils inside the device unit 31 use the rings 40 and 41, so it is not necessary to run wires to accomplish the same. This also results in the simplification of the assembly work.

Moreover, it is also possible to use a normal printed circuit board of glass epoxy resin or the like instead of the configuration whereby a metal reinforcing plate 70 is adhered to the flexible printed circuit board 60. However, if this is done, then deformation and the like will occur in the printed circuit board due to changes in the moisture and temperature environments and this will cause the state of fixing of the flat springs 42a through 45a to change from their initial conditions and tilt the optical axis of the objective lens 33. The result of this tilt of the optical axis is a deterioration of the recording performance in particular.

With respect to this, in the present embodiment having a configuration where a metal reinforcing plate 70 of a thickness suitable to reinforce the flexible printed circuit board 60 is used, there is no deflection or deformation with respect to the temperature and humidity environments. Because of this, the fixing condition of the flat springs 42a through 45a is maintained at the initial state and the problem described above does not occur and the initial performance can be maintained for an extended period of time.

The following description will refer to the method of manufacture of the device unit 31 described above, and also in particular, the method of fixing the flat springs 42 through 45 and the rings 40 and 41 to the objective lens holder 32.

Figure 11:
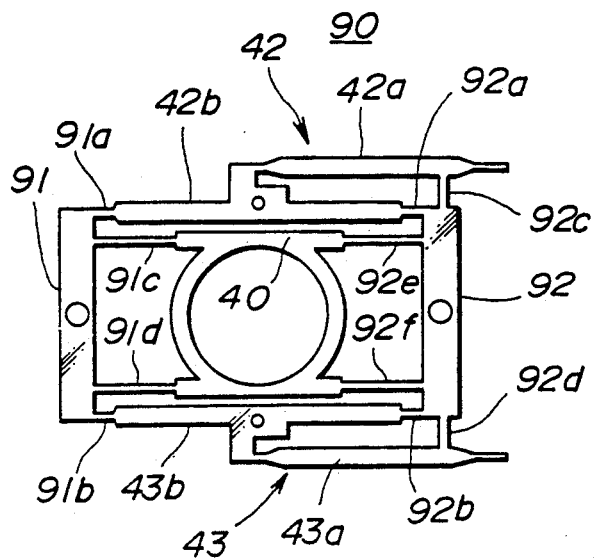
FIG. 11 is a view indicating the frame of the flat spring member.

FIG. 11 indicates a flat spring frame 90.

This flat spring frame 90 is a monolithic structure with a position relationship corresponding to the objective lens holder 32 fastened to the fastening portions 91 and 92 which fasten the flat spring members 42 and 43, and the flat spring members 42 and 43 have a high accuracy of relative positioning.

More specifically, the flat spring members 42 and 43 are linked at one end of arm portions 42b and 43b by the branch portions 91a and 91b of the fastening portion 91, and at the other end by the branch portions 92a and 92b of the fastening portion 92, and by the branch portions 92c and 92d of the fastening portion 92 on the free end side of flat springs 42a and 43a.

The ring 40 is supported by both the pair of branch portions 91c and 91d extending from the fastening portion 91 and the pair of branch portions 92e and 92f extending from the fastening portion 92.

Figure 12:
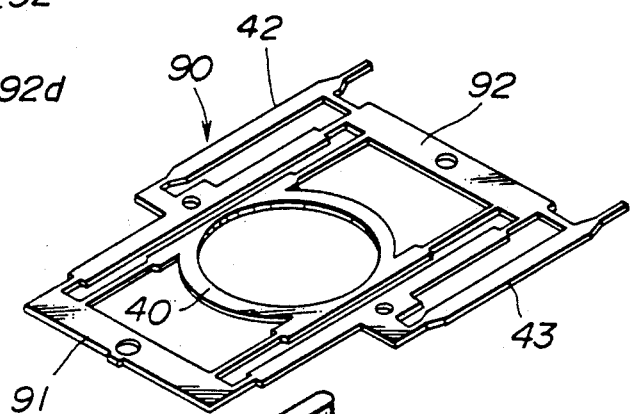
FIG. 12 is a view depicting the mounting of the flat spring member frame to the objective lens holder.
Figure 12:
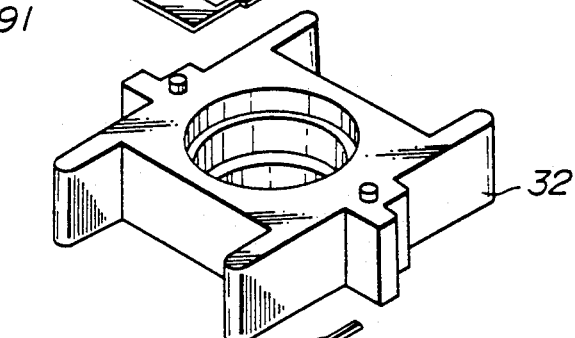
Figure 12:
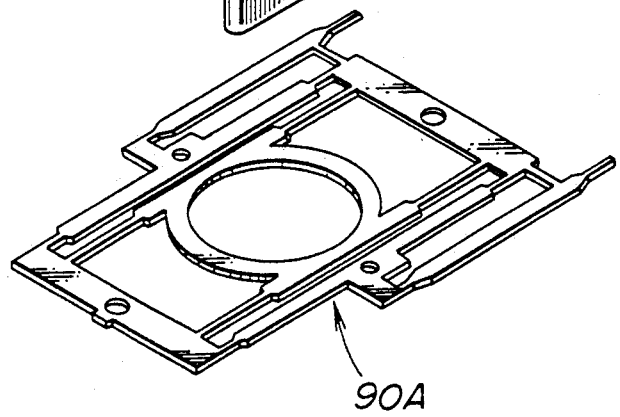
Figure 13:
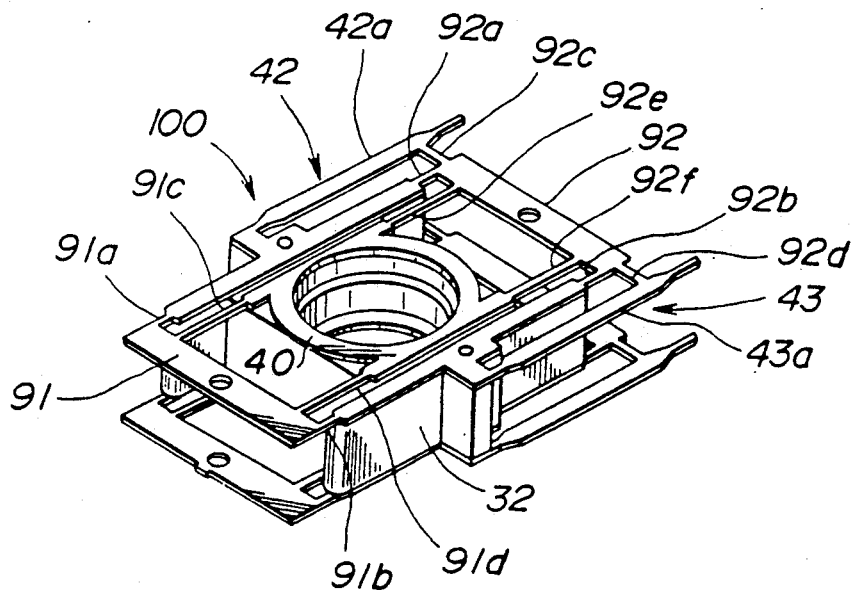
FIG. 13 is a view indicating the condition where the flat spring member frame is mounted on the objective lens holder.

As shown in FIGS. 12 and 13, and the flat spring frames 90 and 90A having substantially the same shape have their positions determined by and are fixed using the upper surface and the lower surface of the objective lens holder 32 as a reference.

Figure 14:
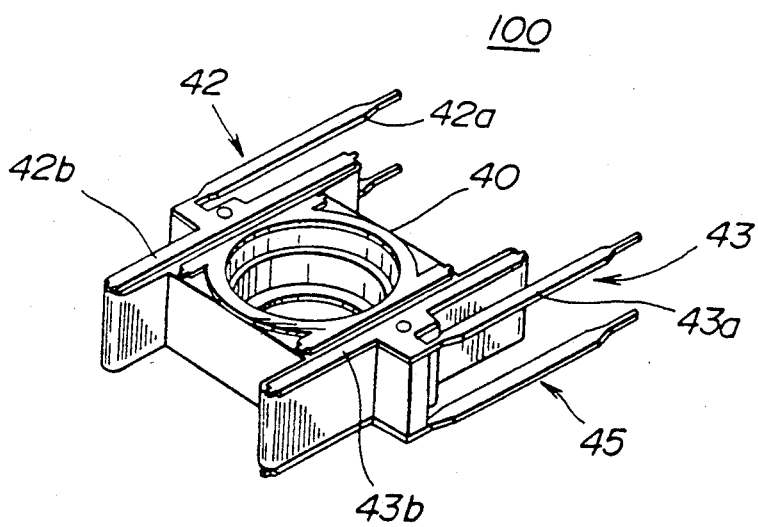
FIG. 14 is a view indicating the condition where fasteners are removed from flat spring members which have been fixed to an objective lens holder indicated in FIG. 13.

After this fixing, the distal ends of each of the arm portions 91a through 91d and 92a through 92f are cut and the fastening portion 91 and fastening portion 92 removed are to produce the assembled state 100 indicated in FIG. 14.

If the four flat spring members 42 through 45 and the two rings 40 and 41 are separately fixed to the objective lens holder 32, then the assembly work will become complicated and it will be difficult to raise the accuracy of positioning each of the flat spring members 42 through 45.

However, if the flat spring frames 90 and 90A described above are used, then the flat spring members 42 and 43 can be fixed to the objective lens holder 32 with a good accuracy of positioning maintained and the quality of the objective lens drive apparatus 30 will be uniformly high.

Furthermore, the number of assembly processes is less than that for a conventional manufacturing method.

The present invention is not limited to the aforementioned embodiments, and variations and modifications may be made without departing from the scope of the invention.

What is claimed is:

1. An objective lens drive apparatus comprising:
an objective lens holder supporting an objective lens and provided with drive coils,
a base fixing permanent magnets,
printed circuit boards fixing said base at a monolithic portion thereof, and
a plurality of flexible support members, having electroconductivity by themselves, electrically and mechanically connected at their base ends to said printed circuit board, and with their distal ends supporting said objective lens holder so as to be flexibly displaced to a position where said drive coils oppose said permanent magnets, and wherein terminals of said drive coils are electrically connected to the flexible support members which are different from one another, and
a drive current is supplied to said drive coils from said printed circuit board to pass through said flexible support members.

2. The objective lens drive apparatus of claim 1, wherein:
said printed circuit board is configured by adhering a metal plate to a flexible printed circuit board having wiring patterns, said metal plate having a thickness sufficient to reinforce said flexible printed circuit board, and
said base ends of said plurality of flexible support members are connected to said flexible printed circuit board.

3. The objective lens drive apparatus of claim 2, wherein:
said metal plate is disposed on one of two surfaces of said flexible printed circuit board, said one surface opposing said objective lens holder, and has cutouts at positions fixing said flexible support members,
said cutouts having widths greater than widths of (a) respective base sides of said flexible support members, and
said flexible support members being inside said cutouts and not being in contact with the inner surfaces of said cutouts.

4. The objective lens drive apparatus of claim 3, wherein:
said flexible printed circuit board has pads of ends of said wiring patterns at the sides of surfaces opposite said metal plate, and
each base end of each of said flexible support members being soldered to each pad on a side of said flexible printed circuit board opposite said metal plate.

5. The objective lens drive apparatus of claim 1, wherein:
each flexible support member has a stem portion which has, at a distal end thereof, a coil terminal connector portion in the vicinity of said drive coils,
terminals of said drive coils being connected to said coil terminal connector portions.

6. The objective lens drive apparatus of claim 1, wherein:
said flexible support members comprise first and second flexible support members extending right and left from an upper surface side of said objective lens holder, and third and fourth flexible support members extending right and left from a lower surface side of said objective lens holder,
said drive coils comprising focus drive coils and tracking drive coils,
terminals of said focus drive coils being electrically connected to said first and second flexible support members and
terminals of said tracking drive coils being electrically connected to said third and fourth flexible support members.

7. The objective lens drive apparatus of claim 1, wherein:
said flexible support members comprise first and second flexible support members extending right and left from an upper surface side of said objective lens holder, and third and fourth flexible support members extending right and left from a lower surface side of said objective lens holder,
said drive coils comprising focus drive coils and tracking drive coils,
said first and second flexible support members having coil terminal connector portions in the vicinity of said focus drive coils,
said third and fourth flexible support members having coil terminal connector portions in the vicinity of said tracking drive coils,
terminals of said focus drive coils being connected to coil terminal connector portions of said first and second flexible support members, and
terminals of said tracking drive coils being connected to coil terminal connector portions of said third and fourth flexible support members.

8. The objective lens drive apparatus of claim 1, wherein:
said flexible support members comprise first and second flexible support members extending left and right from an upper surface side of said objective lens holder,
said drive coils comprising a pair of focus drive coils provided on both sides of said objective lens holder, and four tracking drive coils respectively provided one pair on each side of said objective lens holder and so as to be mutually electroconductive,
an upper surface and a lower surface of said objective lens holder having a first metal ring and a second metal ring provided so as to surround said objective lens holder, and
said pair of focus drive coils being electrically connected at first ends thereof to said first and second flexible support members, and at second ends thereof to said first metal ring.

9. The objective lens drive apparatus of claim 8, wherein:
said first ring has coil terminal connector portions each being in the vicinity of one member of said pair of focus drive coils,
said second ring has coil terminal connector portions each being in the vicinity of one member of said pair of tracking drive coils, terminals of said focus drive coils being connected to said terminal connector portions of said first ring, and terminals of said tracking drive coils being connected to said terminal connector portions of said second ring.

10. In a method for the manufacture of an objective lens drive apparatus in which an objective lens holder holding an objective lens and provided with drive coils, is supported by a plurality of flexible support members, and in which a current is supplied to said coils to drive said objective lens, a frame to which said plurality of flexible support members are fastened by fastening portions, said frame being fixed to said objective lens holder and then fastening portions being removed to isolate each of said flexible support members.

* * * * *